July 31, 1962   C. PERNETTA   3,047,281
SPRINGS

Filed Sept. 9, 1960   2 Sheets-Sheet 1

INVENTOR.
CHARLES PERNETTA
BY
ATTORNEYS

July 31, 1962   C. PERNETTA   3,047,281
SPRINGS

Filed Sept. 9, 1960   2 Sheets-Sheet 2

INVENTOR.
CHARLES PERNETTA
BY
ATTORNEYS

United States Patent Office 3,047,281
Patented July 31, 1962

3,047,281
SPRINGS
Charles Pernetta, London, England, assignor, by mesne assignments, to Ametek, Inc., New York, N.Y.
Filed Sept. 9, 1960, Ser. No. 54,892
9 Claims. (Cl. 267—1)

The invention relates to springs for controlling or effecting linear or substantially linear movement of an element and is particularly but not exclusively concerned with springs for controlling or effecting movements of an element over a small range of movement and in some application of the invention under a small controlling force.

The invention provides the combination with an element whereof a linear or substantially linear movement is to be effected or controlled, and a support relatively to which the movement is to be effected or controlled, of a laminated leaf-spring which (a) is disposed in a plane containing the line of movement of said element, (b) has one end anchored on said support and lying in a direction substantially parallel with the line of said movement, (c) extends in a curve to said element, and (d) engages the element for sliding or rolling movement along the spring on the concave side of the spring at a point displaced from the free end thereof, said point of engagement being further from the support than the smallest free radius of the operative portion of the spring between the element and the support, whereby relative movement between the element and support in one sense tends to straighten the spring, accompanied by sliding and rolling movement as aforesaid, and the spring exerts a restoring force tending to move the element in the opposite sense.

Preferably the spring is pre-formed to give a definite load-deflection characteristic, for example a substantially constant force throughout the range of movement.

However, a spring having a definite but non-constant load-deflection characteristic may be used, for example the spring may have a spiral form, the least radius of curvature being at the free end of the spring.

Some specific embodiments of the invention will now be described by way of example and with reference to the accompanying drawings in which.

Figure 1:
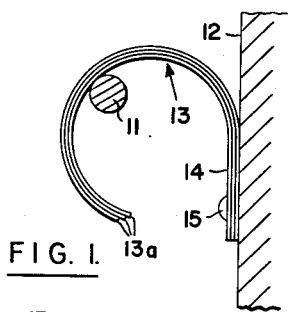
FIGURE 1 is a schematic view of a spring device in accordance with this invention.
Figure 2:
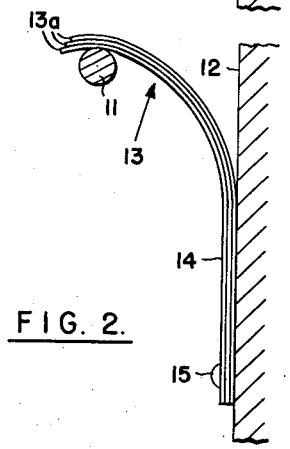
FIGURE 2 is a schematic view of the device of FIGURE 1 showing a different relative position between the parts.

Referring now to the drawings, in FIGURES 1 and 2 a spring control for a peg 11 or the like element movable relatively to a fixed support 12 comprises a laminated leaf spring 13 formed from a plurality of strips 13a, having a substantially circular form but extending through less than 360° when fully relaxed as shown in FIGURE 1, and having one straight end 14 attached to the fixed support 12 by means of a fastening 15. The peg 11, which may be integral with or attached to a movable body (not shown), abuts the concave side of the spring 13 and is slidable along the spring. The peg is spaced from the support by a perpendicular distance which is greater than the radius of curvature of the spring when it is released. Movement of the end 14 causes unwinding deflection of the operative part of the spring 13 between the supports and the peg as shown in FIGURE 2, accompanied by sliding movement of the peg along the spring. The spring 13 then exerts a substantially constant restoring force tending to move the peg 11 downwardly. This restoring force remains substantially constant throughout the movement of the peg 11. The flat surface of support 12 serves to back-up the spring as it is unwound.

Figure 3:
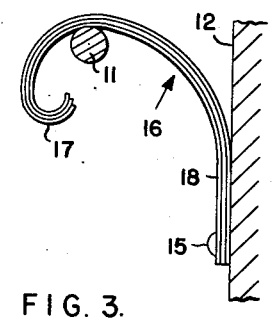
FIGURE 3 is a schematic view of the modification of the device of FIGURE 1.

FIGURE 3 shows a similar arrangement in which a laminated leaf spring 16 has a spiral form, the least radius of curvature of which is at the free end 17 of the spring 16. Movement of the peg 11 upwardly causes deflection of the spring 16 which then exerts a restoring force downwardly on peg 11. This restoring force varies from a maximum when the peg 11 abuts the free end 17 of the spring 16 to a minimum when the spring 16 is substantially fully relaxed.

Figure 4:
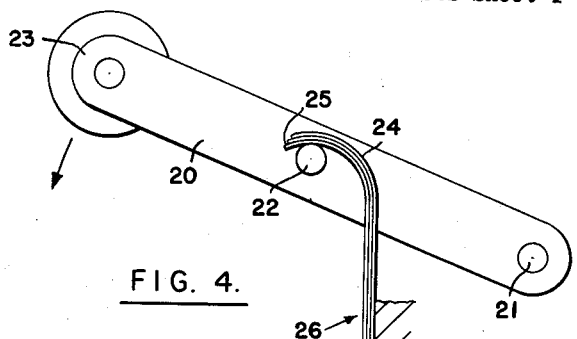
FIGURE 4 is a side elevation of a device in accordance with this invention.

FIGURE 4 shows the application of a spring control to a lever 20 freely secured at one end on a shaft 21 and provided with a peg 22 between the free end 23 of the lever 20 and the shaft 21. The angular movement of the lever is small so that the peg has a substantially linear movement. The peg 22 abuts the concave side of a laminated leaf spring 24 of spiral form having a free end 25 and a straight portion 26 which is attached to a fixed support by a fastening 27. Movement of the lever 20 and shaft 21 in a clockwise sense unwinds the spring 24 and causes it to exert a resisting force on the lever tending to cause it to rotate in the anti-clockwise sense. The restoring force available at the far end 25 of the lever will be less than that of the spring and will vary with the spring force. The torque exerted on the shaft may be substantially constant because although the spring exerts a variable downward force on the lever 20, as already explained with reference to FIGURE 3, as the force decreases (i.e. as the peg abuts the spring further from the free end 25) the moment of the force about the shaft 21 increases and so a substantially uniform torque is produced if a suitable selected spring is used. The characteristic of the spring is, of course, chosen to suit the dimensions of the lever.

Figure 6:
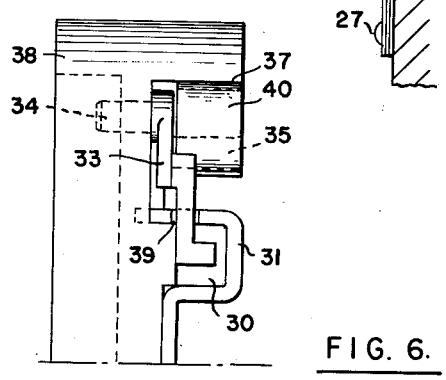
FIGURE 6 is a front elevation of the device of FIGURE 5.
Figure 5:
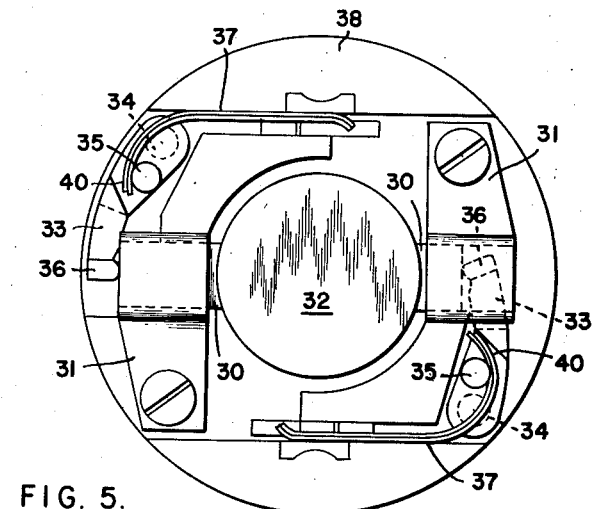
FIGURE 5 is a side elevation of a brush holder of an electric motor employing the device of this invention.

FIGURES 5 and 6 show the application of a spring control similar to that just described to carbon brushes 30 of a miniature electric servomotor. Each brush 30 is held in sliding engagement, in a brush holder 31, and is urged towards a commutator 32 by a cranked lever 33 of nylon. Each lever 33 is freely pivoted at one end on a spindle 34 and is provided with a peg 35. The free end 36 of each lever bears on a brush 30. Each lever 33 is urged against the corresponding brush 30 by a laminated leaf spring 40 having a circular form and a straight part 37. The straight part 37 of each spring 40 is anchored to the frame 38 of the motor. Each brush holder 31 is formed with a slot 39 into which the corresponding lever 33 can enter as it urges the corresponding brush 30, towards the commutator 32. The force exerted by each spring on the corresponding lever and consequently the lesser force exerted on the corresponding brush both remain substantially constant as the brushes wear away.

Figure 7:
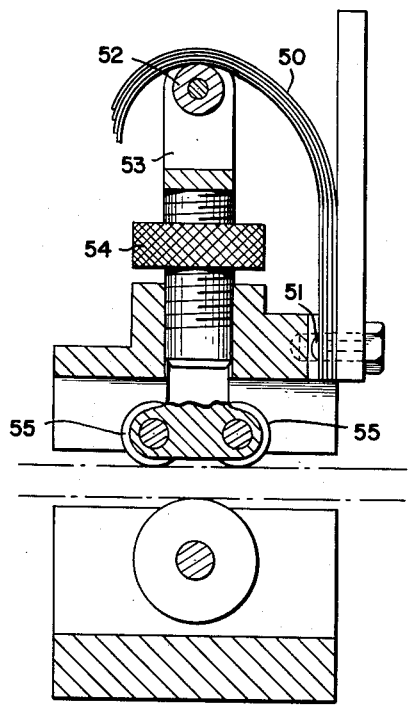
FIGURE 7 is a side elevation of the device of this invention incorporated in a profile follower.
Figure 8:
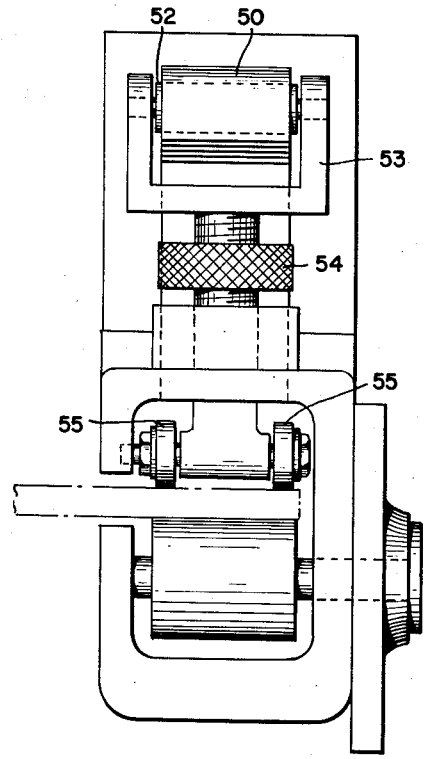
FIGURE 8 is a front elevation of the device in FIGURE 7.

FIGURES 7 and 8 show the application of the spring control to a profile-follower. In this application four spring leaves 50 are superimposed in a laminated arrangement and anchored at a common end by means of a rivet 51. The concave side of the innermost leaf abuts a roller 52 at the upper end of a follower spindle 53. This spindle is formed with a screw thread at its midpart and carries a knurled nut 54 on this threaded part for limiting the downward movement of the spindle 53 under the action of the springs. The lever end of the spindle 53 carries a pair of rollers 55.

It is to be understood that modifications may be made in the above described constructions and it is not desired to be limited except as set forth in the following claims.

What is claimed is:

1. In combination with an element whereof a substantially linear movement is to be effected and a support relatively to which the said movement is to be effected, a laminated leaf spring disposed in a plane containing the line of movement of said element and having one end secured to said support and an arcuate portion spaced from said end, the maximum dimension of said element in said plane being substantially less than the free diameter of said spring, the concave portion of said arcuate portion engaging the element at a point displaced from the free end of the spring whereby relative movement between the element and the support in one sense tends to straighten the arcuate portion of the spring as the element advances along the length of the spring and the spring exerts a restoring force tending to move the element in the opposite direction, the arcuate portion of the spring being less than 360° in extent.

2. The combination as claimed in claim 1 in which the spring is pre-formed to provide a constant force throughout the range of movement.

3. The combination as claimed in claim 1 in which the curvature of the arcuate portion of the spring, when fully relaxed, progressively diminishes from its free end towards the support.

4. The combination as claimed in claim 1 in which the end of the spring which is anchored to said support is substantially straight.

5. The combination as claimed in claim 1 in which the support provides a substantially flat backing-up-surface extending from the spring anchorage parallel to the line of movement aforesaid whereby the surface backs-up the spring as it is straightened and prevents reverse curvature thereof.

6. In combination with a peg whereof a substantially linear movement is to be effected and a support relatively to which the said movement is to be effected, a laminated leaf spring disposed in a plane containing the line of movement of said peg and having one end secured to said support and an arcuate portion spaced from said end, the diameter of said peg in said plane being substantially less than the free diameter of said spring, the concave portion of said arcuate portion engaging the peg at a point displaced from the free end of the spring whereby relative movement between the peg and the support in one sense tends to straighten the arcuate portion of the spring as the peg advances along the length of the spring and the spring exerts a restoring force tending to move the peg in the opposite direction, the arcuate portion of the spring being less than 360° in extent.

7. The combination as claimed in claim 6 in which the support provides a substantially flat backing-up-surface extending from the point where the spring is secured to the support parallel to the line of movement aforesaid whereby the surface backs-up the spring as it is straightened and prevents reverse curvature thereof.

8. In combination with a roller whereof a substantially linear movement is to be effected and a support relatively to which the said movement is to be effected, a laminated leaf spring disposed in a plane containing the line of movement of said roller and having one end secured to said support and an arcuate portion spaced from said end, the diameter of said roller in said plane being substantially less than the free diameter of said spring, the concave portion of said arcuate portion engaging the roller at a point displaced from the free end of the spring whereby relative movement between the roller and the support in one sense tends to straighten the arcuate portion of the spring as the roller advances along the length of the spring and the spring exerts a restoring force tending to move the roller in the opposite direction, the arcuate portion of the spring being less than 360° in extent.

9. The combination as claimed in claim 8 in which the support provides a substantially flat backing-up-surface extending from the point where the spring is secured to the support parallel to the line of movement aforesaid whereby the surface backs-up the spring as it is straightened and prevents reverse curvature thereof.

References Cited in the file of this patent

UNITED STATES PATENTS

| | | |
|---|---|---|
| 187,424 | Slicer | Feb. 13, 1877 |
| 301,963 | Clayton | July 15, 1884 |
| 1,090,292 | Fernald | Mar. 17, 1914 |
| 2,609,192 | Lermont | Sept. 2, 1952 |